(12) United States Patent
van den Akker et al.

(10) Patent No.: US 12,494,304 B2
(45) Date of Patent: Dec. 9, 2025

(54) SYSTEM AND METHOD FOR PROVIDING SIGNALING OVER A CONDUCTIVE MATERIAL IN A CABLE

(71) Applicant: Space Exploration Technologies Corp., Hawthorne, CA (US)

(72) Inventors: Anno van den Akker, Shaker Heights, OH (US); Wilson Ives, Los Angeles, CA (US); David Elliott, Salt Lake City, UT (US); Joshua S. Salazar, Los Angeles, CA (US)

(73) Assignee: Space Exploration Technologies Corp., Starbase, TX (US)

( * ) Notice: Subject to any disclaimer, the term of this patent is extended or adjusted under 35 U.S.C. 154(b) by 134 days.

(21) Appl. No.: 18/223,489

(22) Filed: Jul. 18, 2023

(65) Prior Publication Data

US 2024/0029921 A1   Jan. 25, 2024

Related U.S. Application Data

(60) Provisional application No. 63/391,666, filed on Jul. 22, 2022.

(51) Int. Cl.
*H01B 7/32* (2006.01)
*H01B 7/02* (2006.01)
*H01B 7/282* (2006.01)
*H01B 7/29* (2006.01)
*H01B 11/06* (2006.01)

(52) U.S. Cl.
CPC ............... *H01B 11/06* (2013.01); *H01B 7/02* (2013.01); *H01B 7/282* (2013.01); *H01B 7/29* (2013.01); *H01B 7/32* (2013.01)

(58) Field of Classification Search
CPC ....... H01B 11/06; H01B 11/085; H01B 11/10; H01B 11/1869; H01B 7/32
See application file for complete search history.

(56) References Cited

U.S. PATENT DOCUMENTS 5,808,371 A * 9/1998 Kon'i ................. B60G 17/0195
                                                       307/10.6
10,276,280 B1 * 4/2019 Lewis, Sr. ............... H04L 12/10

* cited by examiner

*Primary Examiner* — Benyam Haile
(74) *Attorney, Agent, or Firm* — Polsinelli PC

(57) ABSTRACT

Systems and methods for using the shield of a cable for communication are disclosed. An example system includes a first electronic device, a second electronic device and a cable coupled to the first electronic device and to the second electronic device and having a conductive material independent of at least one communication line. The first electronic device and the second electronic device can be configured to communicate using a first communication protocol via the at least one communication line and using a second communication protocol via the conductive material. Communications using the second communication protocol can include a feedback signal to indicate a status of at least one of the first electronic device or the second electronic device. The first electronic device can be a user terminal configured to communicate wirelessly with a satellite, and the second electronic device can be a router configured to communicate with at least one user device.

18 Claims, 8 Drawing Sheets

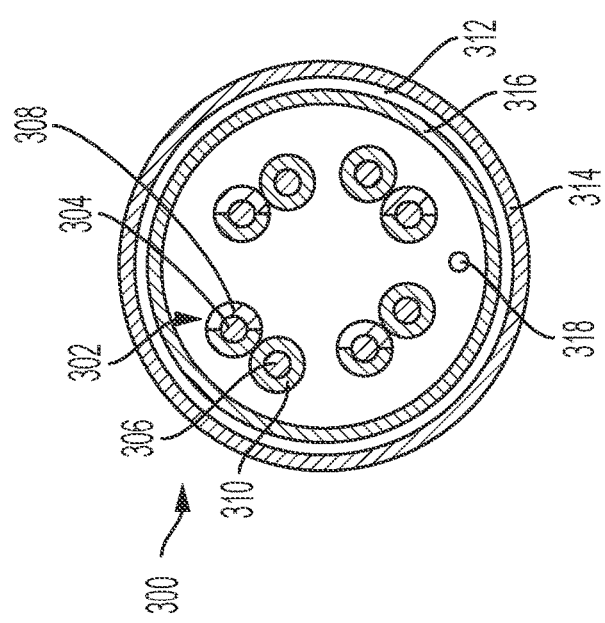
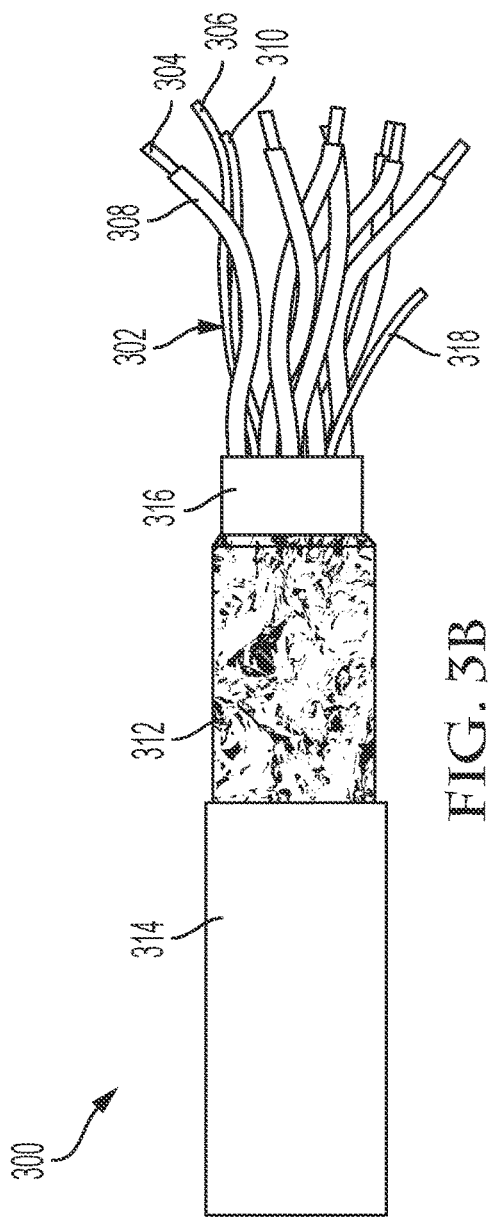
FIG. 3A
FIG. 3B

SYSTEM AND METHOD FOR PROVIDING SIGNALING OVER A CONDUCTIVE MATERIAL IN A CABLE

PRIORITY CLAIM

The present application claims priority to U.S. Provisional Patent Application No. 63/391,666 filed on Jul. 22, 2022, entitled "SYSTEM AND METHOD FOR PROVIDING SIGNALING OVER A CONDUCTIVE MATERIAL IN A CABLE", the contents of which are incorporated herein by reference.

FIELD

The present disclosure pertains to communications technology and, more particularly, to transmitting signals over a conductive shield of a cable or other conductive material independent of the primary data transmission wires or fiber optic and associated systems and methods.

BACKGROUND

High-speed digital communications occur all around us, and the world is becoming more dependent on this digital communication. Many of these high-speed communications involve cables designed to transmit data at a high speed. Many high-speed cables include twisted-pairs or differential-pairs of wires (e.g., category 5 (CAT 5) cable, HDMI cable, etc.). Twisted pair cables include multiple pairs of wires that carry high-speed data using a known protocol. The multiple pairs of wires conventionally transport all the data that is transported over such cables. These high-speed cables further include a shield that encloses all the twisted pairs of wires. The purpose of the shield is to reduce the likelihood of electrical and electromagnetic interference (EMI) from reaching the wires, and to reduce the likelihood of electrical and EMI signals from exiting the high-speed cable. High-speed cables further include an outer sheath (typically an insulator) that encloses all the wires along with the shield and reduce the likelihood of damage to the internal components of the cables and provide insulating properties to reduce the likelihood of electrical shock to individuals.

SUMMARY

In accordance with various embodiments of the present disclosure, systems and methods are disclosed for providing an improved shield structure for cable than enables communication via the shield of a cable. There is a need for an additional channel or medium of communication between computing devices An example system includes a first electronic device, a second electronic device and a cable coupled to the first electronic device and to the second electronic device and having a conductive material independent of at least one communication line. The first electronic device and the second electronic device can be configured to communicate using a first communication protocol via the at least one communication line and using a second communication protocol via the conductive material. Communications using the second communication protocol can include a feedback signal to indicate a status of at least one of the first electronic device or the second electronic device. The first electronic device can be a user terminal configured to communicate wirelessly with a satellite, and the second electronic device can be a router configured to communicate with at least one user device. However, there are no limits on the types of computing or electronic devices that are connected via a cable as described herein.

In one aspect, at least one of the first electronic device or the second electronic device is configured to go to an idle state in response to the feedback signal. The feedback signal can include a time for the at least one of the first electronic device or the second electronic device to remain in the idle state.

In another aspect, the feedback signal includes a first signal and a signal transmitted after the first signal, the at least one of the first electronic device or the second electronic device is configured to go to the idle state in response to the first signal and/or the at least one of the first electronic device or the second electronic device is configured to exit the idle state in response to a second signal. The feedback signal can indicate at least one of a temperature status, motion status, humidity status, a power status, or an operating status of at least one of the first electronic device or the second electronic device.

The second communication protocol can include an analog communication protocol and the first communication protocol can include a digital communication protocol. The cable can be an ethernet cable and the conductive material can include a shield.

The at least one communication line can be configured to transmit a data signal and a power signal. Further, the at least one communication line can include at least one of multiple twisted pairs of communication lines or multiple differential pairs of communication lines. In another aspect, the cable includes a dielectric insulator located between the at least one communication line and the conductive material.

Another example system can include a first electronic device, a second electronic device and a cable coupled to the first electronic device and to the second electronic device and having at least one communication line and a conducting material. The first electronic device and the second electronic device can be configured to communicate using a first communication protocol via the at least one communication line and using a second communication protocol via the conducting material. The second communication protocol can be different than the first communication protocol.

Another example system can include a first electronic device, a second electronic device and a cable coupled to the first electronic device and to the second electronic device and having at least one communication line and a conducting material. The first electronic device and the second electronic device can be configured to communicate data using a first communication protocol via the at least one communication line and to communicate feedback data regarding a connection between the first electronic device and the second electronic device using a second communication protocol via the conducting material. The second communication protocol can be different than the first communication protocol.

Other embodiments can include just one device configured to communicate with a cable configured as described herein, or the cable itself and its structure can be a separate embodiment as well.

An example method includes obtaining sensor data associated with a first computing device and transmitting the sensor data through a port associated with a cable to a second computing device, wherein the port associated with the cable is connected to a conducting material within the cable that is independent of one or more data communicating component in the cable.

The conducting material can include a shield that covers the one or more data communication component in the cable. The one or more designated data communication components can include a wire or a fiber optic cable. The sensor data can be obtained from a sensor in the first computing device and wherein the transmitting of the sensor data according to a first protocol that differs from a second protocol used to transmit data through the one or more data communication component.

One embodiment as noted above can be a cable. In this regard, a cable can include a connector having a first port and a second port, a data communication component for communicating data between a first computing device and a second computing device according to a first protocol. The data communication component can be connected to the first port of the connector and a conducting material separate from the data communication component and contained within the cable. The conducting material can be configured to connect to the second port of the connector for communicating data to and/or from a first component of the first computing device and a second component of the second computing device.

The first component and the second component each can include a respective sensor of one or more of a temperature status, a humidity status and motion status. The data communication component can include a first type of material and the conducting material include a second type of material.

In another aspect, a method can include receiving, from a first port of a first connector configured with a cable and via a shield within the cable, wherein the first connector is connected to a first device, a signal according to a first protocol that differs from a second protocol used for transmitting data through a primary data transmission line within the cable and transmitting the signal via the connecting material or shield through a second port of a second connector configured with the cable that is connected to a second device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 3A is a cross-sectional view of a cable for use in a network and having wires and a cable shield in accordance with embodiments of the present disclosure;

FIG. 3B is a partial cutaway view of the cable of FIG. 3A in accordance with embodiments of the present disclosure;

DETAILED DESCRIPTION

Figure 1:
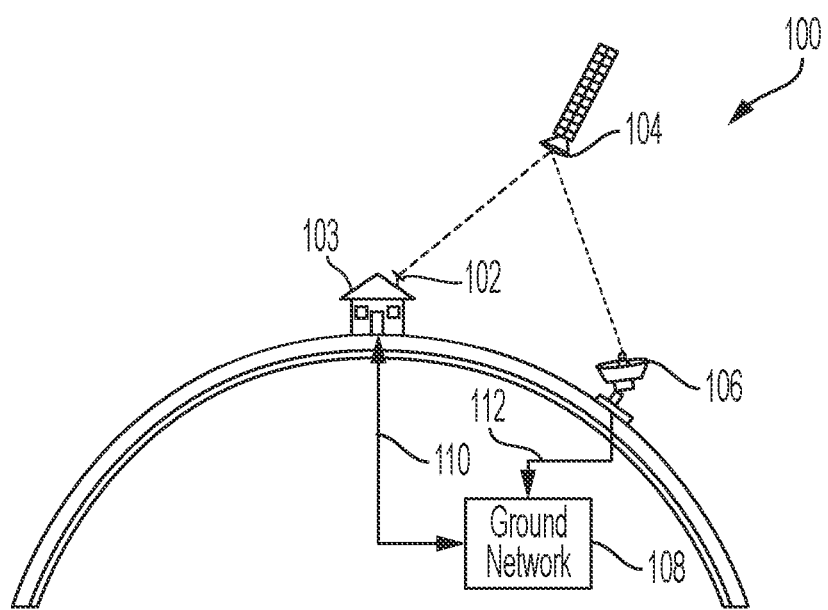
FIG. 1 is a not-to-scale diagram illustrating a simple example of communication in a satellite communication system in accordance with embodiments of the present disclosure.

Various embodiments of the disclosure are discussed in detail below. While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Language such as "top", "bottom", "upper", "lower", "vertical", "horizontal", "lateral", in the present disclosure is meant to provide orientation for the reader with reference to the drawings and is not intended to be the required orientation of the components or to impart orientation limitations into the claims.

Embodiments of the present disclosure are directed to new systems and methods for communications between network components. Conventional high-speed communications occur over twisted pair, or differential pair, cables (e.g., category 5 (CAT 5) cable, HDMI cable, etc.), although communications may occur over cables that lack such twisted or differential pairs. Such cables may be coaxial or any other type of cable and may include a plurality of wires that carry high-speed data using a known protocol. In conventional wired communication networks, multiple wires of a cable transport all data that is transmitted via the cables. Many high-speed cables further include a shield that encircles or encloses some or all of the data-transporting wires. The shield is typically conductive and made from a metal or other conductive material (e.g., Mylar foil, aluminum, copper, silver, gold, etc.). The shield generally reduces electrical and electromagnetic interference (EMI) with the data-transporting wires, and resists egress of electrical and electromagnetic signals from the cable. These cables may further include an outer sheath which may be an insulator. The outer sheath may reduce the likelihood of damage to the internal components of the cable and may also reduce the likelihood of electrical shock to users of the cable. Conventional communication systems only transport data via the internal wires of a cable; however, the present disclosure is directed to systems and methods for transmitting data over the conductive shield in addition to the internal wires.

Communication Networks

Communication networks, including the Internet, may employ many components between and including user devices associated with end users. The user devices may include personal computers, laptops, smartphones, internet-of-things (IOT) devices (e.g., smart thermostat, smart dishwasher, etc.), and the like. Any type of computing device is contemplated as being applicable to the new cable structure disclosed herein. Components between the user devices may include routers, switches, fiber-optic cables, high-speed cables, satellites, satellite receivers, gateways, cable modems, and the like. Different networks may employ different components. For example, terrestrial-based networks may lack satellites and satellite receivers, and satellite-based networks may include satellites and satellite receivers.

Cables may be used to transmit data in many different network configurations. For example, satellite communication systems may provide relatively high-bandwidth, low-latency network communications via a constellation of satellites. Such constellation of satellites may be in a non-geosynchronous Earth orbit (GEO), such as a low Earth orbit (LEO). FIG. 1 illustrates a not-to-scale embodiment of an antenna and satellite communication system 100 in which embodiments of the present disclosure may be implemented. As shown in FIG. 1, an Earth-based endpoint or user terminal 102 is installed at a location directly or indirectly on the Earth's surface such as house or other building, a tower, a vehicle (e.g., land-based vehicle, watercraft, aircraft, spacecraft, or the like), or another location where it is desired to obtain communication access via a network of satellites. An Earth-based endpoint terminal 102 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a geographically stationary or substantially stationary object, such as a platform or a balloon. In some embodiments, the endpoint terminal 102 may be located on a non-stationary object such as a watercraft or aircraft.

A communication path may be established between the endpointor user terminal 102 configured on a building 103 and a satellite 104. In the illustrated embodiment, the first satellite 104, in turn, establishes a communication path with a gateway terminal 106. In another embodiment, the satellite 104 may establish a communication path with another satellite (not shown) prior to communication with a gateway terminal 106. The ground network 108 may be connected via a cable or other communication component 110 to the user terminal 102. The gateway terminal 106 may be physically connected via fiber optic cables, category 5 (CAT5) cable for Ethernet transmissions, or another physical or wireless connection 112 to a ground network 108. The ground network 108 may be any type of network, including the Internet. While one satellite 104 is illustrated, communication may be with and between any one or more satellite of a constellation of satellites. Furthermore, modems, computers in the home, and other devices may use coaxial cables or cables with the sheath disclosed herein.

Figure 2:
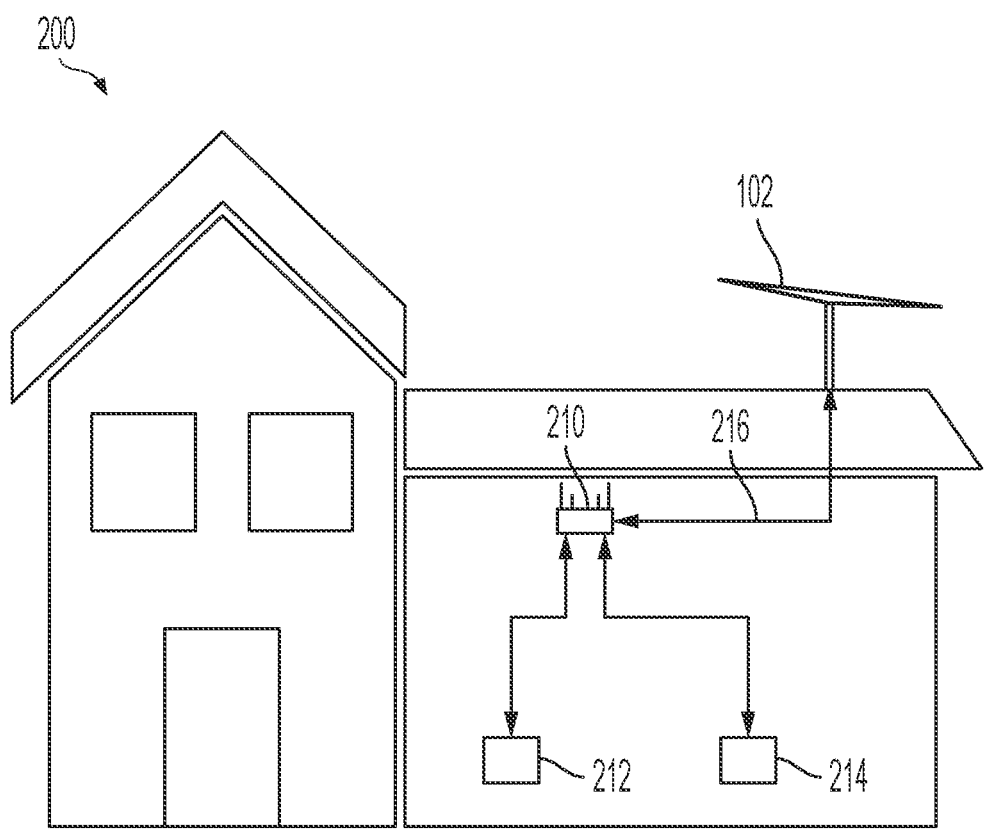
FIG. 2 is a drawing of a network designed to communicate with the satellite communication system of FIG. 1 in accordance with embodiments of the present disclosure.

Referring to FIGS. 1 and 2, the user terminal 102 may communicate with the ground network 108 via the satellite 104 and gateway terminal 106. The user terminal 102 may also be in electrical communication with a router 210 (e.g., a wireless router), and the router 210 may be in electrical communication with user electronic devices, or end user devices, 212, 214. The user devices 212, 214 may include any electronic user devices capable of communicating via a wired or wireless connection with the router 210. For example, the user devices 212, 214 may include a personal computer, a smartphone, a laptop, a tablet, an internet-of-things (JOT) device (e.g., a smart refrigerator), a server, another router, a signal repeater, or any other electronic device capable of communications. In that regard, the user devices 212, 214 may communicate with the ground network 108 via the router 210, the user terminal 102, the satellite 104, and the gateway terminal 106.

The router 210 may communicate with the ground network 108 via a cable 110 or communication component.

In some embodiments, the user terminal 102 may be electrically coupled to the router 210 via a cable 216. Data received by the user terminal 102 may be transmitted to the router 210 via the cable 216. For example, the data received by the user terminal 102 may be transmitted to the router 210 as received or the user terminal 102 may perform some signal processing before transmitting to the router 210. Similarly, data received by the router 210 from the user devices 212, 214 may be transmitted to the user terminal 102 for transmission to the satellite 104 via the cable 216. The data may be transmitted as received from the user devices 212, 214 or the router 210 may perform some signal processing before transmitting to the user terminal 102.

The cable 216 (or cable 110, 112) may include any type of cable. For example, the cable 216 may include a category 5 (CAT 5) cable, a fiber optic cable, a universal serial bus (USB) cable, or any other coaxial, twisted pair, or other cable capable of transmitting data. In some embodiments, the cable 216 may be capable of transmitting data at a relatively high speed (e.g., at least 1 megabit per second (Mbps), at least 5 Mbps, at least 10 Mbps, at least 25 Mbps, at least 50 Mbps, at least 100 Mbps, or the like).

Cable Components

FIGS. 3A and 3B illustrate an exemplary cable 300 may be used as a cable between any two electronic devices (e.g., a first device may include a user terminal (e.g., the user terminal 102 of FIGS. 1 and 2), a cable modem, a user device, or any other terminal capable of electronic communications, and a second device may include a router (e.g., the router 210 of FIG. 2), a switch, a user device, or any other electronic device capable of electronic communications). In general, this disclosure focuses on a new cable structure for a cable 216/110/112 that can be connected to any two computing devices that are capable of using both the primary wires but also the metal sheathing as two independent communication channels.

The cable 300 (e.g., which can also be represented as any of the cables 216/110/112) may include a plurality of components. For example, the cable 300 may include a plurality of wires 302 (which may include any type of conductor capable of transmitting electronic signals) enclosed within a cable shield 312, and the cable shield 312 and wires 302 may be surrounded by, or enclosed within, an insulating sheath 312. The plurality of wires 302 may be conductive and may transport data signals. For example, the wires 302 may include copper, aluminum, gold, or any other conductive materials or a combination of conductive materials. In some embodiments, the plurality of wires 302 may transport both data and power signals. For example, a first one or more wire of the plurality of wires 302 may transport data signals, and a second one or more wire of the plurality of wires 302 may transport power signals. As another example, at least one of the plurality of wires 302 may transport both data and power signals simultaneously or in an alternating fashion.

In one aspect, the shield 312 also represents any conductive material 312 that is configured in connection with the cable 300 but that is not traditionally used for data transmission. Such conductive material 312 is not limited to a function of shielding the internal wires 302, 304, 306, 308, 310 but may have other functions within the cable. The cable 300 can correspond to the cable 216 shown in FIG. 2.

The plurality of wires 302 may be provided in any fashion. For example, the plurality of wires 302 may be provided as twisted pairs, or differential pairs, of wires. In that regard, a first wire 304 and a second wire 306 may be twisted together or may otherwise operate as a differential pair of wires. The plurality of wires 302 may include any quantity of wires and in any configuration. For example, the cable 300 is shown as having four differential pairs of wires along with a drain wire 318.

In some embodiments, the wires 302 may also represent or instead include fiber optic cable capable of transmitting optical data. In that regard, the fiber optic cable may receive optical data and may transmit optical data from a first electrical device to a second electrical device (and, potentially, vice versa). In some embodiments, the wires 302 may include at least one fiber optic cable capable of transmitting fiber optics and at least one electrically conductive wire. The fiber optic cable may transmit optical data between two or more electrical devices, and the conductive wire may transmit a power signal, one or more data signal, or a combination of power and data signals. In any of these different types of cables, a sheath or other conducting material 312 may be used in some manner in the cable 300 which is not typically used for data transmission. For example, some deep-sea cables that have steel wires and a copper tubing to protect optical fibers. Central steel wires may be used as well for some deep-sea fiber optic cables for reasons other than shielding. Any other wires or conducting material structure within a cable that is typically not used for transmission of data can apply to the principles disclosed herein.

In one example, the primary transmission components of a cable 300 might be a wire or a fiber optic cable. The secondary or alternate transmission components can be also a conducting material and, in some cases, a different material such as a fiber optic cable. The primary transmission components 302, 304, 306, 308 and the secondary or alternate transmission components 312 might not be of the same type of material. For example, a conducting wire of a first type might be typically used to strengthen a fiber optic cable which is of a second type. Thus, the cable might primarily transmit data via the fiber optic cable but also transmit data as described herein via the wire which is of the second type. The types may also be different types of metals as well.

The drain wire 318 may be used in the cable 300 in conjunction with the shield 312 to ensure effective grounding. The drain wire 318 serves to complete an electrical circuit from the shield 312 and carry unwanted electrical noise to ground away from the circuit. The drain wire 318 may, for example, include a tinned copper conductor. In some embodiments, the cable 300 may lack a drain wire. In some embodiments, the drain wire 318 may be coupled to an electrical ground and the shield 312 may be coupled to a non-ground component. In some embodiments, neither the drain wire 318 nor the shield 312 may be coupled to ground. In some embodiments, both the drain wire 318 and the shield 312 may be coupled to ground.

The plurality of wires 302, 304, 306, 308 may include any material. For example, the wires 302, 304, 306, 308 may include copper, tin, aluminum, silver, gold, platinum, or any other conductive material. In some embodiments, the wires 302, 304, 306, 308 may include multiple materials such as gold-plated copper, tinned copper, or the like. In some embodiments, at least some of the wires may be insulated to reduce the likelihood of electrical interference between the various wires. For example, the first wire 304 may be surrounded or enclosed by a first insulator 308, and the second wire 306 may be surrounded or enclosed by a second insulator 310. The insulators may include any one or more insulating material such as a plastic, another polymer, or any other insulating material (e.g., polyvinyl chloride (PVC), polyethylene (PE), low smoke and fume material (LSF), low smoke halogen free material (LSHF), polytetrafluoroethylene (PTFE), rubber, neoprene, silicone, polyurethane (PUR), nylon, or the like). Each wire of the plurality of wires 302, 304, 306, 308 may be enclosed or surrounded by a separate insulator. In some embodiments, each twisted pair may be surrounded by a second shield and/or sheath. For example, the first wire 304 (surrounded by the first insulator 308) and the second wire 306 (surrounded by the second insulator 310) may be twisted together, and the twisted pair may be enclosed within a conductive shield, and the conductive shield and twisted pair may be enclosed within another insulator. In some embodiments, the twisted pair may be enclosed within only one of an insulator or a shield.

The sheath 314 may include any insulating material that insulates the inner components of the cable 300 (all components located within the sheath 314, e.g., the plurality of wires 302, 304, 306, 308 and the shield 312). In that regard, the sheath 314 may enclose or surround the entire bundle of components within the cable 300. The sheath 314 may also mechanically protect the inner components of the cable 300 from mechanical damage and environmental exposure (e.g., the sheath 314 may reduce the likelihood of scrapes and abrasion, may reduce the likelihood of debris entering the cable 300 and interfering with operation of the wires 302, 304, 306, 308, may reduce the likelihood of ingress of moisture which may corrode or otherwise degrade the components, etc.). In that regard, the sheath 314 may include any insulating material. In some embodiments, it may be further desirable for the material of the sheath 314 to be resistant to damage and to be water resistant. This may be especially true if any portion of the cable 300 is to be in an outdoor environment or an environment in which regular or periodic contact between the cable and another object is likely. For example, the sheath 314 may include at least one of polyvinyl chloride (PVC), polyethylene (PE), low smoke and fume material (LSF), low smoke halogen free material (LSHF), polytetrafluoroethylene (PTFE), rubber, neoprene, silicone, polyurethane (PUR), nylon, or the like.

In some embodiments, a cable 300 may include an inner sheath 316 located between the outer sheath 314 and the shield 312. The inner sheath 316 may provide similar functionality as the outer sheath 314 and may further reduce the likelihood of electrical contact between the wires 302, 304, 306, 308 and the shield 312.

Many environments (such as a house with many electrical devices or a factory floor) may typically be electrically noisy environments. Electrical noise, either radiated or conducted as electromagnetic interference (EMI), can seriously disrupt the proper operation of electrical equipment. Although the sheath 314 and the insulators 308, 310 may protect the cable 300 mechanically from scraps and abrasion and environmentally from moisture and spills, these insulating materials may be transparent or semi-transparent to electronic or electromagnetic energy (e.g., EMI) and may offer no protection from the electronic or electromagnetic energy. In that regard, the conductive shield 312 may be added to combat the effects of EMI.

Cables 300 can be a main source of transfer for EMI, both as a source and receiver. As a source, the cable 300 may either conduct noise to other equipment or act as an antenna radiating noise. As a receiver, the cable 300 may pick up EMI radiated from other sources. The shield 312 reduces the effect of EMI transmission and receipt and is a primary mechanism to combat EMI in cables. The shield 312 surrounds the inner signal- or power-carrying conductors or wires 302, 304, 306, 308. The shield 312 may act on EMI in at least two ways. First, the shield 312 may reflect external energy directed towards the cable 300 and may reflect energy generated by the internal wires 302, 304, 306, 308. Second, the shield 312 may pick up any noise at least one of from external sources and from the internal wires 302, 304, 306, 308 and may conduct such noise to ground (or elsewhere). In any case, the external EMI may fail to reach the wires 302, 304, 306, 308, and internally-generated EMI may fail to exit the cable 300. Some energy may still pass through the shield 312, but it may be sufficiently attenuated to reduce or eliminate any resulting interference.

The shield 312 may include any conductive material. For example, the shield 312 may include a metal (e.g., aluminum, copper, tin, gold, or the like), any other conductor (e.g., Biaxially-oriented polyethylene terephthalate (Mylar)), or any combination thereof. The shield 312 may be provided in any configuration. For example, the material of the shield 312 may be provided as a foil surrounding the inner components, as a braided material surrounding the components, a combination of foil and braid, or the like. The shield 312 may not completely surround the other components but may only partially surround them. Foil shielding may include a thin layer of metal or other material (e.g., aluminum or Mylar), and the foil may be attached to a carrier such as polyester to add strength and ruggedness. In some embodiments, foil shielding may provide 100 percent (100%) coverage of the conductors it surrounds, which may be desirable. The foil shielding is relatively thin, which may increase difficulty of working with it, especially when applying a connector. In some embodiments, rather than attempting to ground the entire shield 312, the drain wire 318 is used to terminate and ground the shield 312 (or the drain wire 318 may be grounded while the shield 312 remains ungrounded). However, in some embodiments, the shield 312 may be grounded with or without inclusion of a drain wire 318.

A braid aspect of the shield 312 may include a woven mesh of bare or tinned copper wires, Mylar, or the like. The braid may provide a low-resistance path to ground and may be easier to terminate by crimping or soldering when attaching a connector. However, braided shields may not provide 100% coverage and, in fact, may allow small gaps in coverage. Depending on the tightness of the weave, braids may provide between 70% and 95% coverage. When the cable is stationary, 70% may be sufficient for desirable characteristics of the cable 300. Because copper has higher conductivity than aluminum and the braid has more bulk for conducting noise, the braid may be more effective as a shield. However, a braid may add size and cost to the cable 300.

In some embodiments, the shield 312 may be grounded and the cable 300 may further include the drain wire 318. In some embodiments, the shield 312 may not be grounded and the cable 300 may include the drain wire 318. In some embodiments, the shield 312 may be grounded and the cable 300 may lack a drain wire. In some embodiments, the shield 312 may not be grounded and the cable 300 may lack a drain wire.

In some embodiments, one or more additional cable shield (not shown) may be added to the cable 300. For example, a subset of wires 302, 304, 306, 308 (e.g., each pair of wires in a twisted pair configuration) may be enclosed within an additional cable shield (i.e., the additional shield may be located radially outside of the pair of wires 302, 304, 306, 308 and their corresponding insulators 308, 310 and within the inner sheath 316). The additional cable shield may function in a similar manner as the shield 312, may be formed from a similar or different material, and may be used to provide similar capabilities. In some embodiments, if additional cable shields are used radially outward from the wires 302, 304, 306, 308 and inward relative to the inner sheath 316, additional inner sheaths (not shown) may also be included. These additional inner sheaths may be located radially outward from the additional cable shield and may surround a subset of wires 302, 304, 306, 308 (e.g., may surround each pair of wires 302, 304, 306, 308 in a twisted pair configuration) and its corresponding additional shield. Further, as noted above, there may be other internal wires, rods or other conductive material in connection with fiber optic cables or other cables that may be used as described herein. This disclosure is not limited to a shield or sheath that surrounds conducting wires.

Signaling Over a Cable Shield

Figure 3C:
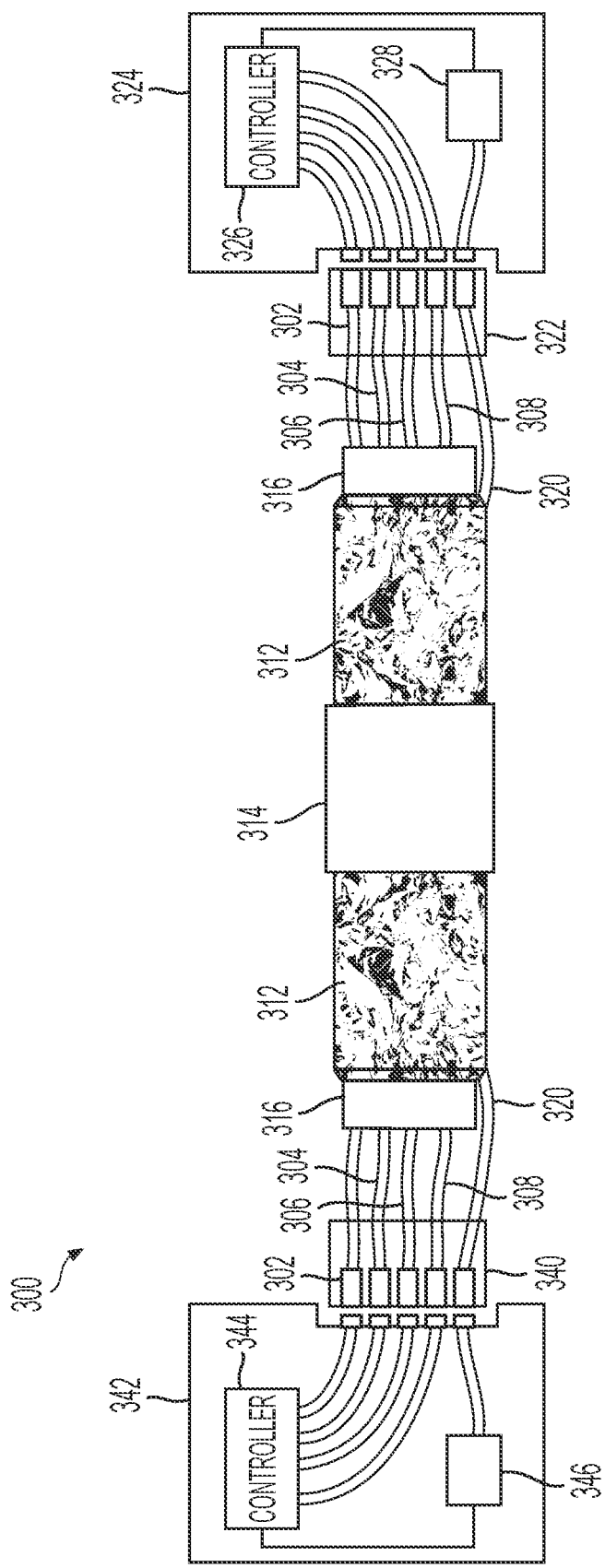
FIG. 3C illustrates a view of the cable of FIG. 3B connected to two devices.

FIG. 3C illustrates the cable 300 with the conductive material as a shield 312, the inner sheath 316, and various wires 302, 304, 306, 308. A connector 322 is illustrated which represent a number of different possible types of connectors such as a CAT5 or other connector used to connect the cable 316 to a device 324. The device 324 can be characterized as an electronic device, a computing device or other type of device 324. For example, the device 324 can represent the user terminal 102, a satellite 104, a router 210 or any other device that can use a cable 300 as described herein for communication with another device. In one case, the conductive material or shield 312 is also connected via a wire 320 to a port in the connector 322. Device 324 can include a controller 326 or other computer component such as a bus or communication module that receives and transmits data on the cable 300. Another component 328 can represent a sensor, thermometer, a humidity detector, carbon-dioxide or carbon monoxide detector, computer processor, and/or other component that is connected separately to the port associated with the wire 320 that is attached to the conducting material or shield 312. The component 328 can also include any receiver or a driver or controller that responds to a sensor input. The component 328 can be in communication with the controller 326 for instructions or to exchange data. Note that while the port in the connector 322 associated with the conducting material or shield 312 is separate and is shown as being connected to the component 328, this is only exemplary as the data path can also be similar to the other wires to the controller 326. In this manner, device 324 and another similar device at the other end of the cable 300 can communicate temperature data or status, humidity data or status, motion data or status, or other data using the conductive material or shield 312 in ways not currently possible.

Figure 4:
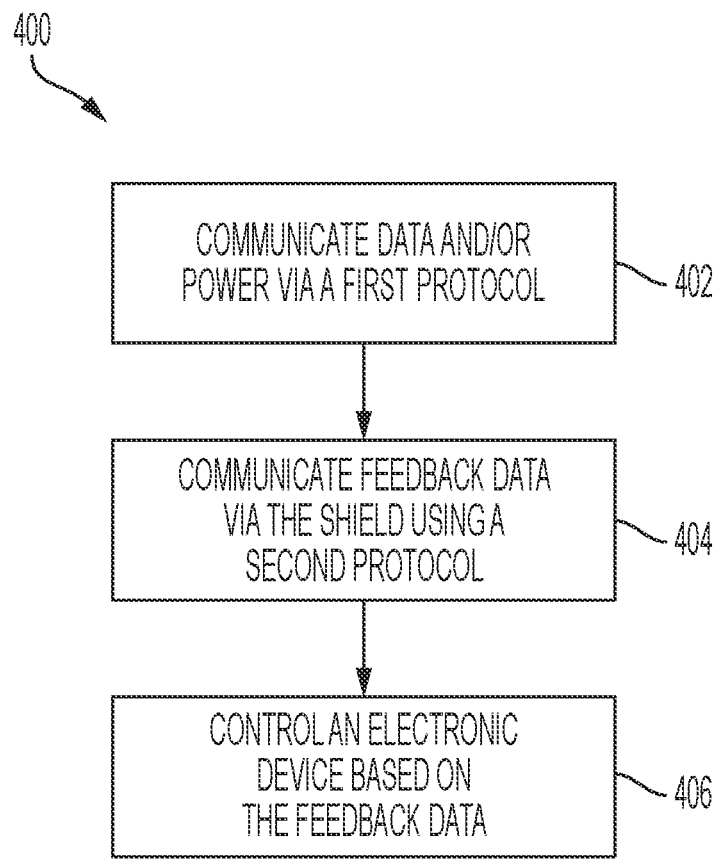
FIG. 4 is a flowchart illustrating a method for signaling over a cable shield in accordance with embodiments of the present disclosure.

Due to the purpose of the shield 312 being to reduce the ingress and egress of EMI from wires of a cable and the fact that many cable shields are connected to electrical ground, conventional communication systems do not transmit and receive data signals over a cable shield. However, because cable shields 312 are conductive, they offer an opportunity for additional communications that are unavailable via wires within a cable due to specific limitations of the various protocols that utilize cables. For example, an Ethernet protocol offers limited ability to communicate a status of the various electronic devices. FIG. 4 illustrates an example method 400 that may be used to communicate status information between two electronic devices (e.g., between the user terminal 102 and the router 210) using signaling data over a shield or secondary conducting material.

With reference to FIG. 2, situations may arise in which an electronic device 324 may be incapable of proper operation. For example, the user terminal 102 may be installed in an environment exposed to extreme elements, such as in a desert which is exposed to extreme temperatures (e.g., in Arizona, Utah, California, the United Arab Emirates, or other hot desert environment) or in northern latitudes which may be exposed to freezing rain and snow. In these extreme environments, situations may arise in which electronic devices fail to function properly. For example, in relatively high temperatures (e.g., above 100- or 210-degrees Fahrenheit) electronic devices may cease proper function. For example, due to overheating of components, a controller of the electronic device may turn off the electronic device to prevent overheating.

In conventional communication systems, an electronic device (e.g., a user terminal 102 and a router 210) may communicate with each other using known protocols (e.g., an Ethernet protocol). These conventional protocols may fail to provide a mechanism for transmitting current status information between the electronic devices. For example, a convention protocol may fail to provide a mechanism for a user terminal 102 exposed to extreme temperatures to inform a router 210 that the user terminal 102 will be shutting down due to the extreme temperatures to reduce the likelihood of components overheating. Thus, the device 324 can include a sensor 328 that can communicate sensor-related data through the proper port and through the conductive material or the shield 312 to another device which can take appropriate action.

It may be desirable for the electronic device that is continuing to operate to be aware of the fact that the component that is overheating will be shutting down. Such shutdowns may occur in other situations as well. For example, an aircraft may have a user terminal 102 and a router 210 that are powered by the aircraft. Power may cease to be provided for a period of time (e.g., 0.1 seconds, 1 second, 5 seconds, or the like) when power is switched from ground power (e.g., the aircraft may be plugged into an electrical socket on the ground) to engine power (e.g., a gas turbine engine may power a generator to generate electrical power). During this transition, one or both of the user terminal 102 or router 210 may power down due to the lack of input power. In this situation as well, the protocols used by the devices may be incapable of informing a paired electrical device that the shutdown is occurring.

Because existing protocols for cable transmissions lack a mechanism for providing a status update of the electrical components, it is desirable for such status update to be provided in a different manner. In that regard and referring to FIGS. 2, 3A, 3B, 3C and 4, a method 400 may be used to provide data communications between a first electronic device (e.g., the user terminal 102) and a second electronic device (e.g., the router 210) using a conductive shield (e.g., the shield 312) of a cable (e.g., the cable 216 or the cable 300) or other conductive material in the cable. The data communications over the conductive material may utilize an analog communication protocol. The communication protocol may differ from the protocol used by the wires 302, 304, 306, 308 of the cable 300 which may include a digital protocol or other protocol. The use of an analog protocol may provide advantages such as increased speed of information transfer (e.g., because an analog-to-digital conversion is not necessary prior to transmission). Use of the analog protocol may also, in some embodiments, allow the shield to remain electrically coupled to ground while simultaneously transmitting an analog signal. The data transfer rate of the analog signal may be relatively low, which may further reduce the effect of EMI on the cable shield 312, and may reduce output of EMI by the cable shield 312. The communication protocols may be different in general and not different just between an analog protocol and a digital protocol. Other differences are contemplated.

In using a cable shield to transmit and receive data, a connector on either end of the cable may have a contact that is electrically coupled to the cable shield 312, and the contact may be designed to be electrically coupled to a respective electrical contact on the electronic device 324. For example, a first end of the cable 216 may have a connector that electrically connects the wires (e.g., wires 202) of the cable 216 to respective contacts of the user terminal 102 and also electrically couples the cable shield to a respective contact of the user terminal 102 (e.g., a grounded contact or another contact). A second end of the cable 216 may have a connector that electrically connects the wires (e.g., wires 202) of the cable 216 to respective contacts of the router 210 and also electrically couples the cable shield to a respective contact of the router 210 (e.g., a grounded contact or another contact). In that regard, the user terminal 102 may be electrically coupled to the router 210 via the internal wires of the cable 216 (e.g., the wires 202), and may also be electrically coupled to the router 210 via the cable shield (e.g., the shield 212).

FIG. 3C further shows another electronic device 342 with a controller 344 and a component 346 connected via a connector 340. Note that the wires 302, 304, 306, 308 are the same as the wires connected to the electronic device 324. The component 346 can be in communication with the controller 344.

An example method 400 is show in FIG. 4. In block 402, at least one of data signals and power signals may be transmitted between the two electrical devices 324 via the wires (e.g., the wires 202 or wires 302, 304, 306, 308) of the cable 300 using any protocol (e.g., ethernet, fiber distributed data interface (FDDI), link layer discovery protocol (LLDP), attached resource computer network (ARCnet), universal serial bus (USB), or the like). In some embodiments, a first protocol which provides for both data and power signal transmission may be used (e.g., Power over Ethernet (PoE)). This data may include data to be communicated between a user device 212, 214 and a ground network (e.g., the ground network 108 of FIG. 1) and may include any type of data that is capable of digital transmission or data transmission in general. The power signals may include any power signal to be provided to an electronic device from another electronic device. For example, the router 210 may be electrically connected to a power outlet (e.g., a 210 volt 60 Hertz power outlet, a 220 volt 50 Hertz power outlet, or the like), while the user terminal 102 may lack a connection to a power outlet. The router 210 may include a power conditioner that conditions the power from the outlet into a power signal usable by the router 210. In some embodiments, the power conditioner or another power conditioner may further condition the power from the outlet (or the power from the first power conditioner) into a power signal usable by the user terminal 102 or any computing device 324. In that regard, the wires of the cable 216 may transmit the conditioned power (e.g., from the second power conditioner) from the router 210 to the user terminal 102. The power may be transmitted via dedicated wires of the cable 216 or via wires designed to transmit a combination of power and data signals (e.g., using PoE). The transfer of power and data signals may continue to occur while the electronic devices are both operating and coupled via the cable 216. The first step 402 basically may require the communication of data and/or power via a first protocol using the traditional wiring of a cable 300.

The method 400 can further include, as is shown in block 404, the two electronic devices (e.g., the user terminal 102 and the router 210 or two computing devices 324) communicating via the shield or other conductive material 312 of the cable 300. For example, the shield 312 or other conductive material in any configuration within the cable 300 may communicate feedback data between the devices (which may include previous, current, or upcoming status of the transmitting device, a status of the transmitting device, operational instructions provided to the receiving device, whether the power and/or data signals via the wires of the cable 300 or 216 are being properly interpreted, or any other feedback). The communication that occurs over the cable shield or conductive material 312 may include a different protocol than the protocol used for data and/or power transmission via the wires of the cable. For example, the first protocol used for data and/or power transmission via the wires 302, 304, 306, 308 may include dedicated power signals (e.g., a direct current (DC) power signal), digital data signals (e.g., Ethernet, ARCnet), or a combination of power and data signals (e.g., PoE), while the second protocol used for data transmission along the shield or conductive material 312 may include a different protocol. For example, and as mentioned above, the data transmitted via the shield or conductive material 312 may include an analog signal. In some embodiments, the protocol used to transport the data and/or power signals via the wires 302, 304, 306, 308 may be a relatively highspeed protocol (e.g., at least 1 Kilohertz (KHz), at least 100 KHz, at least 1 Megahertz (MHz), at least 10 MHz, at least 100 MHz, at least 1 Gigahertz (GHz), at least 10 GHz, at least 100 GHz, or the like). In some embodiments, the protocol used to transport the data and/or power signals via the wires may be a digital signal. A digital protocol may be defined as a protocol that utilizes digital transmissions (e.g., the transmission of signals that vary discretely with time between two values of some physical quantity, one value representing the binary number 0 and the other representing 1).

In some embodiments, the protocol used to transport the feedback data (which may include any type of data) may be relatively lower speed (e.g., less than 1 MHz, less than 100 KHz, less than 10 KHz, less than 1 KHz, less than 500 Hz, less than 100 Hz, less than 10 Hz, or the like). In some embodiments, the protocol used to transmit the feedback data may be of a lower frequency than the protocol used to transmit the data and/or power signal via the wires. In some embodiments, the protocol used to transport the feedback data may be an analog protocol. An analog protocol may be defined as a protocol that utilizes analog transmissions (e.g., a transmission method of conveying information using a continuous signal which varies in amplitude, phase, or some other property in proportion to that information). Use of an analog protocol for the feedback signal may provide advantages such as being easier and quicker to generate, transmit, and process. An electronic device may be notified of immediate status changes of another electronic device using an analog protocol as opposed to a digital protocol because of the speed and ease of generation, transmission, and processing. The disclosed approach is beneficial because the feedback signal may be generated by an electronic device in an urgent situation (e.g., if the user terminal 102 needs to shut down due to overheating, use of the analog protocol for the feedback signal may allow the notification of the shutdown to be transmitted to the router 210 prior to the actual shutdown). Analog signals may also be of higher density than digital signals and may present more refined information. Analog signals may also utilize less bandwidth than digital signals and may utilize less power than digital signals.

The electronic devices (e.g., the user terminal 102, the router 210, or any other two electronic devices 324) may each include a controller 326 that is electrically coupled to the shield of the cable 216. In some embodiments, the controller 326 of an electronic device 324 may be coupled to both the wires of the cable 216 and the shield of the cable 216. In some embodiments, a first controller of an electronic device may be coupled to the wires of the cable 216 and a second controller of the electronic device may be coupled to the shield of the cable 216. In that regard, the controller 326 may handle generation, transmission, receipt, and interpretation of the feedback signals that are transmitted via the shield of the cable 216. The feedback signals may include any feedback signals. For example, the feedback signals may indicate a past status or operation of the electronic device 324, a current status or operation of the electronic device 324, a predicted future status or operation of the electronic device 324, (e.g., the status may include a power overdraw event, a loss of power event, an operating status (e.g., the electronic device fails to operate as designed), a system overheat event, a system malfunction event, a loss of connection to a remote device (e.g., if the user terminal 102 loses communication with satellites), etc.) or the like. The feedback signals may indicate a current condition in an environment of the electronic device 324 (e.g., a temperature in an environment of the device, motion data, or heavy moisture in the environment), information received by the electronic device 324 corresponding to an upcoming action of the electronic device 324 (e.g., that the electronic device may momentarily lose power, for example, if an aircraft is switching from ground power to engine power, or that the electronic device has been instructed to shut down or restart), information indicating improper operation of the other electronic device 324 (e.g., if the data and/or power signals from the other electronic device are unintelligible or non-existent), or any other feedback information.

The controller 326 of each electronic device 324 (e.g., the user terminal 102 and the router 210) may monitor the status of the respective electronic device (e.g., the controller of the user terminal 102 may monitor the status of the user terminal 102). The controller 326 may periodically, continuously, or from time to time generate status data corresponding to the status of the electronic device 324 (e.g., a status, a current operation, an operating status, a current condition in the environment, an upcoming action of the electronic device, or any other status data). For example, the controller 326 may monitor operation and sensors of the electronic device 324 and generate the status data. The controller 326 may then transmit the status data as the feedback data to the other electronic device 324 via the shield 312 of the cable (e.g., the cable 216). In some embodiments, the controller 326 of the electronic device 324 may also or only generate status data corresponding to the electronic device 324 in response to a change in status of the electronic device 324. For example, if the electronic device 324 is aware that it has lost, or will lose, power then the controller 326 may generate status data indicating the lost power. As another example, if the electronic device 324 has overheated, or is about to overheat (thus stopping or eliminating proper operation of the electronic device 324) then the controller 326 may generate status data indicating such overheating. In response to generating the status data (either periodically, continuously, from time to time, or in response to a change in status) then the controller 326 may control the cable shield 312 to transmit the status data to the other electronic device.

Similarly, the controller 326 of each electronic device 324 may receive the feedback signal with the status data corresponding to the other electronic device via the cable shield 312. In that regard, each electronic device 324 (e.g., the router 210) may be aware of the current status of the other electronic device 324 (e.g., the user terminal 102) based on the feedback signal received via the cable shield 312. For example, if the user terminal 102 is overheating and about to power down, the user terminal 102 may transmit feedback data to the router 210 indicating that the user terminal 102 is overheating and will be powering down momentarily. The router 210 may then receive this feedback signal and be aware of the upcoming shutdown. Similarly, if the user terminal 102 is functioning properly, the router 210 may be aware of this proper operation at least one of in response to the periodic, continuous, or from time-to-time feedback signal indicating such proper operation, or in response to a lack of a feedback signal indicating improper operation.

In some embodiments, only one of the two connected electronic devices 324 is capable of identifying status data corresponding to its operation. In such embodiments, the other electronic device 324 may be capable of receiving, understanding, and taking action based on the received status data. In some embodiments, both connected electronic devices 324 are capable of identifying status data corresponding to their operation. In such embodiments, both electronic devices 324 may be capable of receiving, understanding, and taking action based on the received status data of the other electronic device 324.

In that regard, one or both electronic devices 324 coupled to the cable 300 may be aware of the status of the other electronic device 324 based on the feedback data (or lack thereof) from the other electronic device. In block 406, at least one of the electronic devices may control one or more aspect of its operation based on the feedback signal from the other electronic device 324 that corresponds to the status data of the other electronic device 324.

For example, in response to exposure to extreme temperatures, the user terminal 102 may begin to operate improperly, may decide to shut down to prevent an overheating event, or the like. Prior to shutdown (or in response to identifying potential improper functioning), the user terminal 102 may generate status data indicating the potential improper operation or the upcoming shutdown. The user terminal 102 may then generate a feedback signal to transmit to the router 210 via the shield of the cable 216 and may cause the shield to transmit the feedback signal to the router 210. In response to receiving the feedback signal, the router 210 may be made aware of the status change of the user terminal 102 and may take an action in response to being made aware of such status change. For example, the router 210 may go into an idle state in response to learning that the user terminal 102 will be shutting down and will remain in the idle state until notified that the user terminal 102 has resumed operation. Entering an idle state rather than continuously attempting to reconnect with the user terminal 102 when the user terminal is offline reduces power waste and provides for smoother operation of the system. In addition, the feedback signal may indicate an amount of time in which the user terminal 102 will be powered down. In such situations, the router 210 may hold all requests for data transfer from and/or to the user terminal 102 until the user terminal 102 is to come back online. A similar process may occur in cases in which the router 210 is to power down and the user terminal 102 receives this feedback data.

As another example, electronics on an aircraft may experience a lack of power in certain situations, such as when the aircraft electronics are switched from ground power (i.e., electrical energy is provided by a generator or other ground-based energy source) to aircraft power (i.e., electrical energy is provided by a generator that is powered by a gas turbine or other engine of the aircraft). In conventional situations in which this power switch occurs, a period of time (e.g., 100 milliseconds, 200 milliseconds, 1 second, 5 seconds, or the like) exists in which no power is available for aircraft electronics. In situations in which a router 210 and user terminal 102 are installed on an aircraft, an aircraft controller may inform at least one of the router or the user terminal that power will be lost for a period of time while the aircraft power switches from ground power to aircraft power (or vice versa). In response to learning this information, the informed electronic component (e.g., the router) may transmit a feedback signal to the user terminal 102 informing the user terminal that power will be lost for a period of time. Rather than entering a full shutdown state, the user terminal 102 may instead enter an idle state for the period of time which results in less downtime than if the user terminal 102 entered a full shutdown state. A similar process may occur if the user terminal 102 learns of the upcoming lack of power and informs the router thereof.

Accordingly, the method 400 of FIG. 4 provides various advantages over the current state of the art. For example, the method 400 may result in reduced energy loss, thus saving power in many situations. As another example, the method 400 may result in smoother operation of a system that includes two or more electronic devices 324. The method 400 may provide these advantages while still being able to communicate via wires of a cable 300 using a known protocol (such as USB or Ethernet), thus allowing the method 400 to be implemented without having to develop a new high-speed data and/or power transfer protocol. Because many cables already include cable shields 312, the method 400 may be implemented without having to develop new cable designs and hardware to support the new designs.

In another example, a computing device 324 can include at least one processor and a computer-readable storage medium storing instructions which, when executed by the at least one processor, cause the at least one processor to perform operations including transmitting one of data signals and power signals to a second computing device via wires of a cable 300 using a first protocol, communicating via a shield or other conductive material of the cable using a second protocol, feedback data to the second computing device and controlling the computing device or the second computing device based on the feedback data.

Figure 5A:
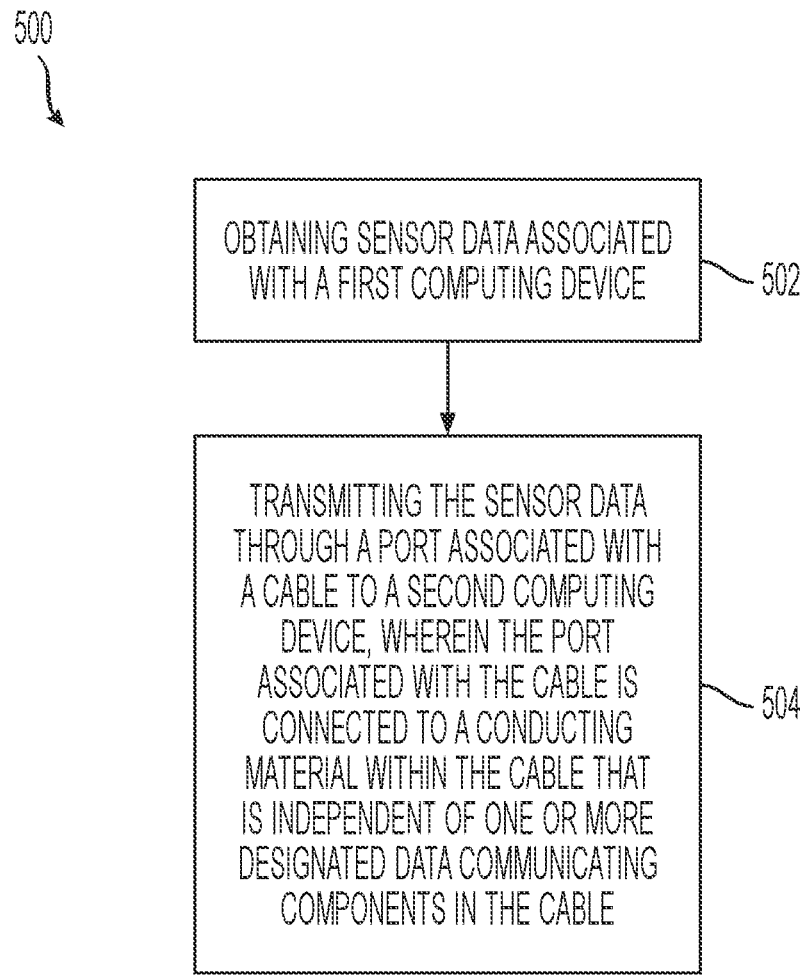
FIG. 5A illustrates a method embodiment according to an aspect of this disclosure.

FIG. 5A illustrates another method 500 of this disclosure. The method 500 can apply generally to the cable 300 and computing device 324 shown in FIG. 3C. The method 500 can include obtaining sensor data associated with a first computing device 324 (502) and transmitting the sensor data through a port associated with a cable 300 to a second computing device 342, wherein the port associated with the cable 300 is connected to a conducting material or shield 312 within the cable 300 that is independent of one or more designated data communicating components or wires 302, 304, 306, 308 in the cable (504). In this regard, the data communicating components can include wires, fiber optical cables or other components or wires 302, 304, 306, 308 that are designed to carry data transmitted on the cable 300. The conducting material 312 referenced can be the type of conducting material not traditionally designed for transmitting data but that is used for shielding or support of the cable 300 rather than data communication. The method 500 is from the standpoint of the computing device 324 of FIG. 3C and the sensor 328 configured therein. Another method can also cover a secondary device 342 which will receive the data transmitted from communication line 320 through the conducting material 312 to the secondary device 342.

In one aspect, an embodiment can be the cable 300 itself which can include an outer covering 314, a cable shield or conducting material 312, and wires 302, 304, 306, 308 may be surrounded by, or enclosed within, the conducting material or shield 312. The cable 300 can include a connector 322 with a first set of ports for the wires 302, 304, 306, 308 that are traditionally included for data transmission. Another port can be included in the connector 322 for separate transmission of physical conditions of a computing device 324 or for other data.

In one aspect, a computing device 324 can include at least one processor and a computer-readable storage medium storing instructions which, when executed by the at least one processor, cause the at least one processor to perform operations including obtaining sensor data associated with the computing device and transmitting the sensor data through a port associated with a cable 300 to a second computing device 342. The port associated with the cable 300 can be connected to a conducting material 312 within the cable 300 that is independent of one or more designated data communicating components or wires 302, 304, 306, 308 in the cable 300.

Figure 5B:
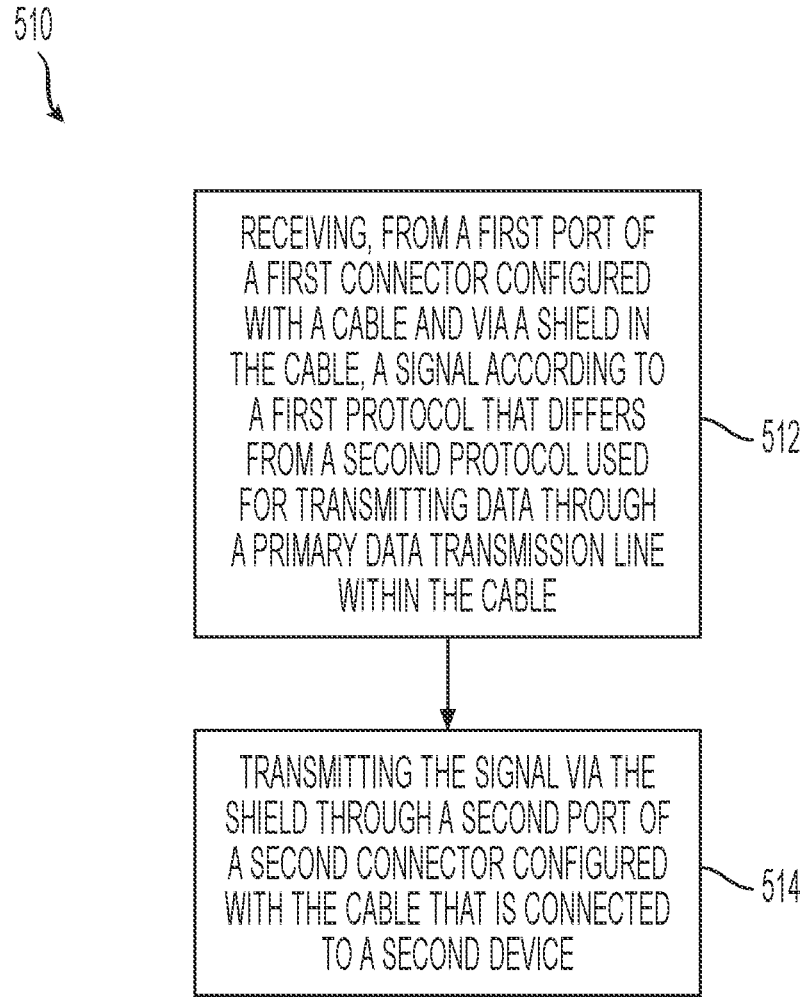
FIG. 5B illustrates another method embodiment according to an aspect of this disclosure.

A method could also be provided from the standpoint of the cable 300. This method 510 is shown in FIG. 5B. In this regard, the cable 300 can be configured as described herein. The method 510 can include receiving, from a first port of a first connector 322 configured with a cable 300 and via a shield 312 within the cable 300, wherein the first connector 322 is connected to a first device 324, a signal according to a first protocol that differs from a second protocol used for transmitting data through a primary data transmission line within the cable 300 (512). The cable 300 can receive the signal and cause the signal to be transmitted through the cable 300 via the conducting material or shield 312 that is independent of the primary data transmission line 302, 304, 306, 308. The method 510 can include the cable 300 transmitting the signal via the connecting material or shield 312 through a second port of a second connector 340 configured with the cable 300 that is connected to a second device 342 (514).

In another aspect, the use of the shield 312 for feedback data or for any kind of communication can be intelligently applied. In one example, the controller 326 and/or component 328 can include a module or engine that determines a state associated with the shield 312. The state, for example, might be that the cable 300 is in an environment where EMI signals exist and the shield 312 is protecting the internal wires 302, 304, 306, 308 from the EMI signals. In such a context, it may be less desirable to use the shield 312 for data communication. The computing device 324 may choose, based on a determination that EMI signals exist around the cable 300, not to transmit data on the shield 312. The computing device 324 may delay transmission of data using the shield 312 based on such information or may make a later determination of the state of the cable 300. In one aspect, the computing device 324 may weigh a value of information relative to the state of the cable 300 in connection with deciding whether to transmit data on the shield 312. For example, if the value of the data is high (e.g., the computing device 324 is overheating and it is of high value to inform computing device 342 of the overheating condition) and the issue of the cable 300 is not severe (e.g., there is a medium level of EMI around the cable 300), then an intelligence engine operating as part of the controller 326 may cause the data to be transmitted on the shield 312 to the second computing device 342. In this regard, an intelligence engine may be deployed to selectively transmit data on the shield 312 of the cable 300 based on one or more factors as described herein. Different thresholds can be established and different functions can be implemented such as a delay in transmission, a cancellation of transmission until a later sensor reading is made, and so forth. A number of different variations are contemplated for determining what action to take based on received data associated with a state of the cable 300 and with respect to whether, when and how to transmit data on the shield 312 of the cable 300. The following are example factors that can be used as input to determine an output or action relative to transmitting data via the shield 312. One or more of these factors can be evaluated for taking an action related to data transmission on the shield 312 of the cable 300: A length of the cable 300, an EMI condition, a heating condition, a priority or value of one or more of data to be transmitted and/or a value of the device 324 that will transmit or receive the data, a time of day, data related to a condition of other devices such as a satellite 104, user terminal 102, gateway 106 or other device, a predicted event which may or may not happen, a condition of the cable 300 in general, a bandwidth condition, load balancing considerations, a cost of data transmission, a schedule or timing associated with data transmission on the shield 312, humidity data, motion data, a power status, an operating status of a device, an inertia state of a device, and so forth.

Figure 6:
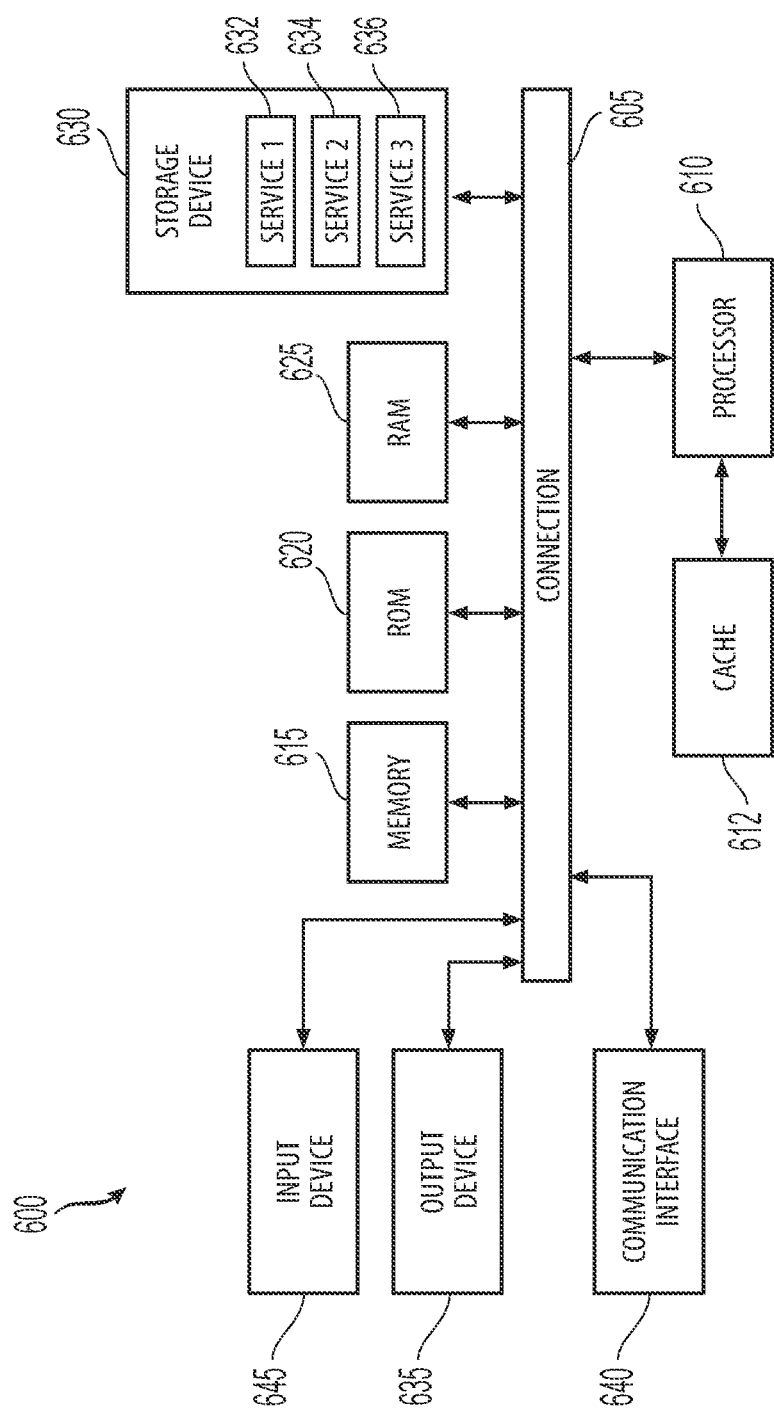
FIG. 6 illustrates an example system in accordance with embodiments of the present disclosure.

An intelligence engine configured on the controller 326 can be an artificial intelligence model, machine learning model, or any variation thereof. Such models can be trained to receive input or data as described above or other types of data and make classifications or decisions regarding an action to take. For example, a machine learning model can be trained on network and/or cable 300 conditions and classify the input as a triggering scenario for a certain action or set of actions such as certain messages to be send via the shield 312. FIG. 6 is a diagram illustrating an example of a system for implementing certain aspects of the present technology. In particular, FIG. 6 illustrates an example of computing system 600, which may be for example any computing device making up internal computing system, a remote computing system, a camera, or any component thereof in which the components of the system are in communication with each other using connection 605. Connection 605 may be a physical connection using a bus, or a direct connection into processor 610, such as in a chipset architecture. Connection 605 may also be a virtual connection, networked connection, or logical connection.

In some aspects, computing system 600 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 600 includes at least one processing unit (CPU or processor) 610 and connection 605 that communicatively couples various system components including system memory 615, such as read-only memory (ROM) 620 and random access memory (RAM) 625 to processor 610. Computing system 600 may include a cache 612 of high-speed memory connected directly with, in close proximity to, or integrated as part of processor 610.

Processor 610 may include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which may represent any number of input mechanisms, such as a microphone for speech, a touch-sensitive screen for gesture or graphical input, keyboard, mouse, motion input, speech, etc. Computing system 600 may also include output device 635, which may be one or more of a number of output mechanisms. In some instances, multimodal systems may enable a user to provide multiple types of input/output to communicate with computing system 600.

Computing system 600 may include communications interface 640, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 630 may include software services, servers, services, etc., that when the code that defines such software is executed by the processor 610, the software causes the system to perform a function. In some aspects, a hardware service that performs a particular function may include the software component stored in a computer-readable medium in connection with the necessary hardware components, such as processor 610, connection 605, output device 635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language and language within the specification reciting "at least one of" refers to at least one of a set and indicates that one member of the set or multiple members of the set satisfy the claim. For example, claim language and language within the specification reciting "at least one of A and B" means A, B, or A and B. As another example, claim language and language within the specification reciting "at least one of A or B" means A, B, or A and B.

Clauses according to this application can include:

Clause 1. A system for communications, the system comprising: a first electronic device; a second electronic device; and a cable coupled to the first electronic device and to the second electronic device and having a conductive material independent of at least one communication line, wherein the first electronic device and the second electronic device are configured to communicate using a first communication protocol via the at least one communication line and using a second communication protocol via the conductive material.

Clause 2. The system of clause 1, wherein communications using the second communication protocol include a feedback signal to indicate a status of at least one of the first electronic device or the second electronic device.

Clause 3. The system of clause 2 or any previous clause, wherein the first electronic device is a user terminal configured to communicate wirelessly with a satellite, and the second electronic device is a router configured to communicate with at least one user device.

Clause 4. The system of clause 3 or any previous clause, wherein at least one of the first electronic device or the second electronic device is configured to go to an idle state in response to the feedback signal.

Clause 5. The system of clause 4 or any previous clause, wherein the feedback signal includes a time for the at least one of the first electronic device or the second electronic device to remain in the idle state.

Clause 6. The system of clause 4 or any previous clause, wherein: the feedback signal includes a first signal and a signal transmitted after the first signal; the at least one of the first electronic device or the second electronic device is configured to go to the idle state in response to the first signal; and the at least one of the first electronic device or the second electronic device is configured to exit the idle state in response to a second signal.

Clause 7. The system of clause 2 or any previous clause, wherein the second communication protocol comprises an analog communication protocol.

Clause 8. The system of clause 7 or any previous clause, wherein the first communication protocol includes a digital communication protocol.

Clause 9. The system of clause 2 or any previous clause, wherein the feedback signal indicates at least one of a temperature status, motion status, humidity status, a power status, or an operating status of at least one of the first electronic device or the second electronic device.

Clause 10. The system of clause 1 or any previous clause, wherein the cable is an ethernet cable.

Clause 11. The system of clause 10 or any previous clause, wherein the conductive material comprises a shield.

Clause 12. The system of clause 10 or any previous clause, wherein the at least one communication line is configured to transmit a data signal and a power signal.

Clause 13. The system of clause 1 or any previous clause, wherein the at least one communication line comprises at least one of multiple twisted pairs of communication lines or multiple differential pairs of communication lines.

Clause 14. The system of clause 1 or any previous clause, wherein the cable includes a dielectric insulator located between the at least one communication line and the conductive material.

Clause 15. A system for communications, the system comprising: a first electronic device; a second electronic device; and a cable coupled to the first electronic device and to the second electronic device and having at least one communication line and a conducting material, wherein the first electronic device and the second electronic device are configured to communicate using a first communication protocol via the at least one communication line and using a second communication protocol via the conducting material, the second communication protocol being different than the first communication protocol.

Clause 16. The system of clause 15, wherein communications using the second communication protocol include a feedback signal to indicate a status of at least one of the first electronic device or the second electronic device.

Clause 17. The system of clause 16 or any of clauses 15-16, wherein the first electronic device is a user terminal configured to communicate wirelessly with a satellite, and the second electronic device is a router configured to communicate with at least one user device.

Clause 18. The system of clause 17 or any of clauses 15-17, wherein at least one of the first electronic device or the second electronic device is configured to go to an idle state in response to the feedback signal.

Clause 19. The system of clause 18 or any of clauses 15-18, wherein the feedback signal includes a time for the at least one of the first electronic device or the second electronic device to remain in the idle state.

Clause 20. A system for communications, the system comprising: a first electronic device; a second electronic device; and a cable coupled to the first electronic device and to the second electronic device and having at least one communication line and a conducting material, wherein the first electronic device and the second electronic device are configured to communicate data using a first communication protocol via the at least one communication line and to communicate feedback data regarding a connection between the first electronic device and the second electronic device using a second communication protocol via the conducting material, the second communication protocol being different than the first communication protocol.

Clause 21. A method comprising: obtaining sensor data associated with a first computing device; and transmitting the sensor data through a port associated with a cable to a second computing device, wherein the port associated with the cable is connected to a conducting material within the cable that is independent of one or more data communicating component in the cable.

Clause 22. The method of clause 21, wherein the conducting material comprises a shield that covers the one or more data communication component in the cable.

Clause 23. The method of clause 22 or any of clauses 21-22, wherein the one or more data communication component comprises a wire or a fiber optic cable.

Clause 24. The method of clause 21 or any of clauses 21-23, wherein the sensor data is obtained from a sensor in the first computing device and wherein the transmitting of the sensor data occurs according to a first protocol that differs from a second protocol used to transmit data through the one or more data communication component.

Clause 25. A cable comprising: a connector having a first port and a second port; a data communication component for communicating data between a first computing device and a second computing device according to a first protocol, the data communication component connected to the first port of the connector; and a conducting material separate from the data communication component and contained within the cable, the conducting material configured to connect to the second port of the connector for communicating data to and/or from a first component of the first computing device and a second component of the second computing device.

Clause 26. The cable of clause 25, wherein the first component and the second component each comprise a respective sensor of one or more of a temperature status, a humidity status and motion status.

Clause 27. The cable of clause 25 or any of clauses 25-26, wherein the data communication component comprises a first type of material and the conducting material comprises a second type of material.

Clause 28. A method comprising: receiving, from a first port of a first connector configured with a cable and via a shield within the cable, wherein the first connector is connected to a first device, a signal according to a first protocol that differs from a second protocol used for transmitting data through a primary data transmission line within the cable; and transmitting the signal via the connecting material or shield through a second port of a second connector configured with the cable that is connected to a second device.

We claim:

1. A system for communications, the system comprising:
a first electronic device;
a second electronic device; and
a cable coupled to the first electronic device and to the second electronic device and having a conductive material independent of at least one communication line,
wherein the first electronic device and the second electronic device are configured to communicate using a first communication protocol via the at least one communication line and using a second communication protocol via the conductive material, wherein communications using the second communication protocol include a signal to indicate a status of at least one of the first electronic device or the second electronic device.

2. The system of claim 1, wherein the first electronic device is a user terminal configured to communicate wirelessly with a satellite, and the second electronic device is a router configured to communicate with at least one user device.

3. The system of claim 2, wherein at least one of the first electronic device or the second electronic device is configured to go to an idle state in response to the feedback signal.

4. The system of claim 3, wherein the feedback signal includes a time for the at least one of the first electronic device or the second electronic device to remain in the idle state.

5. The system of claim 3, wherein:
the feedback signal includes a first signal and a signal transmitted after the first signal;
the at least one of the first electronic device or the second electronic device is configured to go to the idle state in response to the first signal; and
the at least one of the first electronic device or the second electronic device is configured to exit the idle state in response to a second signal.

6. The system of claim 1, wherein the second communication protocol comprises an analog communication protocol.

7. The system of claim 6, wherein the first communication protocol includes a digital communication protocol.

8. The system of claim 1, wherein the feedback signal indicates at least one of a temperature status, motion status, humidity status, a power status, or an operating status of at least one of the first electronic device or the second electronic device.

9. The system of claim 1, wherein the cable is an ethernet cable.

10. The system of claim 9, wherein the conductive material comprises a shield.

11. The system of claim 9, wherein the at least one communication line is configured to transmit a data signal and a power signal.

12. The system of claim 1, wherein the at least one communication line comprises at least one of multiple twisted pairs of communication lines or multiple differential pairs of communication lines.

13. The system of claim 1, wherein the cable includes a dielectric insulator located between the at least one communication line and the conductive material.

14. A system for communications, the system comprising:
a first electronic device;
a second electronic device; and
a cable coupled to the first electronic device and to the second electronic device and having at least one communication line and a conducting material,
wherein the first electronic device and the second electronic device are configured to communicate using a first communication protocol via the at least one communication line and using a second communication protocol via the conducting material, the second communication protocol being different than the first communication protocol, wherein communications using the second communication protocol include a signal to indicate a status of at least one of the first electronic device or the second electronic device.

15. The system of claim 14, wherein the first electronic device is a user terminal configured to communicate wirelessly with a satellite, and the second electronic device is a router configured to communicate with at least one user device.

16. The system of claim 15, wherein at least one of the first electronic device or the second electronic device is configured to go to an idle state in response to the feedback signal.

17. The system of claim 16, wherein the feedback signal includes a time for the at least one of the first electronic device or the second electronic device to remain in the idle state.

18. A system for communications, the system comprising:
a first electronic device;
a second electronic device; and
a cable coupled to the first electronic device and to the second electronic device and having at least one communication line and a conducting material,
wherein the first electronic device and the second electronic device are configured to communicate data using a first communication protocol via the at least one communication line and to communicate feedback data regarding a connection between the first electronic device and the second electronic device using a second communication protocol via the conducting material, the second communication protocol being different than the first communication protocol.

* * * * *